United States Patent [19]

Sargoytchev

[11] Patent Number: 5,801,831

[45] Date of Patent: Sep. 1, 1998

[54] FABRY-PEROT SPECTROMETER FOR DETECTING A SPATIALLY VARYING SPECTRAL SIGNATURE OF AN EXTENDED SOURCE

[75] Inventor: Stoyan Ivanov Sargoytchev, Toronto, Canada

[73] Assignee: Institute For Space And Terrestrial Science, Ontario, Canada

[21] Appl. No.: 717,288

[22] Filed: Sep. 20, 1996

[51] Int. Cl.$^6$ ........................................... G01B 9/02
[52] U.S. Cl. ........................................... 356/346; 356/352
[58] Field of Search ................................. 356/346, 352

[56] References Cited

U.S. PATENT DOCUMENTS 5,198,872  3/1993  Wakabayashi et al. ................. 356/352

OTHER PUBLICATIONS

A. Balebanov et al. Spectrometer with Spatial resolution based on a Fabry–Perot interferometers, Translated from Pribory i Teknika Eksperimenta, No. 2, pp. 179–180, 1985, Translated in: Instruments and Experimental techniques vol. 28, No. 2, pt. 2, pp. 457–459.

P.D. Hammer et al. An imaging interferometer for terrestrial remote sensing, SPIE Proceedings vol. 1937, pp. 244–255, 1994.

*Primary Examiner*—Frank G. Font
*Assistant Examiner*—Robert Kim
*Attorney, Agent, or Firm*—Senniger, Powers, Leavitt & Roedel

[57] ABSTRACT

Fabry-Perot spectrometer comprises a Fabry-Perot etalon, a pair of cylindrical lenses with parallel vertices which lenses are spaced so that they smear light from a source in a direction which is perpendicular to their vertices, a focusing lens assembly, and a detector at the focus of the focusing lens assembly. The detector lens assembly comprises two cylindrical lenses, one with a vertex parallel to the vertex of the smearing cylindrical lenses and one with a vertex perpendicular to the vertex of the smearing cylindrical lenses in order to avoid spectral aliasing. The result is that light from "slices" on the source extending perpendicular to the smearing cylindrical lens vertices is smeared at the detector so that spectral information which would otherwise be hidden by virtue of interference maximums not falling on imaged emitting points appear on the smeared slices. The spectrometer therefore provides spectral information for any given slice perpendicular to the vertex of the cylindrical lenses, such that the image on the detector contains spectral information along one direction with spatial information along the perpendicular direction.

20 Claims, 3 Drawing Sheets

FABRY-PEROT SPECTROMETER FOR DETECTING A SPATIALLY VARYING SPECTRAL SIGNATURE OF AN EXTENDED SOURCE

FIELD OF THE INVENTION

This invention relates to a Fabry-Perot spectrometer which provides spatially resolved spectrograms.

DESCRIPTION OF THE RELATED ART

Spectrometers are used for a number of astronomical, atmospheric, and terrestrial surface investigations in order to determine the spectral content of (and therefore the composition of) a light emitting body. For atmospheric and terrestrial surface investigations, the light emitting sources are generally not point sources but, instead, extended sources. With an extended source, it is generally desirable to determine the spectral signature from different areas of the source.

Interferometer devices act as spectrometers when they are used to measure a spectrum in a limited spectral band. There are known two-beam interferometer devices which provide spectral scanning with spatial resolution. A drawback with some of these devices is that they are not well adapted for applications which require a high spectral resolution, such as investigations of trace gases in the atmosphere. Further, two-beam interferometers which do provide high spectral resolution are complicated and bulky. Some applications therefore suggest the use of multi-beam interferometers which provide high spectral resolution.

A Fabry-Perot interferometer is a multi-beam interferometer which, in its simplest form, comprises two parallel optically flat working surfaces with semi-transparent highly reflecting coatings, known as an etalon, followed by a focusing lens. If the separation of the working surfaces is fixed, the component of the interferometer comprising the working surfaces is commonly referred to as a fixed Fabry-Perot etalon. The space between the working surfaces could be air, a vacuum, or a solid (glass) material. The response of an etalon to monochromatic light is given by the well-known Airy function, as follows:

$$A = [1 + F(\sin(2\pi n d \cos\theta/\lambda))^2]^{-1}$$

where $\theta$ is the off-axis angle of an incoming ray of light inside the etalon, n is the refractive index of the etalon gap between the two working surfaces, d is the distance between the two working surfaces, $\lambda$ is the wavelength of the light, and F is the coefficient of finesse. The finesse is a function of the reflectivity of the coated working surfaces.

Given non-parallel incident rays (such as rays from an extended source), the etalon produces a fringe pattern at the focal plane of the focusing lens. The fringe pattern produced by an Airy function has a central maximum, known as the central order (or zero order) maximum, and a series of progressively more closely spaced narrower maximums spaced outwardly from the central maximum. The maximum adjacent the central order is known as the first order maximum, the next most adjacent maximum is the second order maximum and so on.

If the incoming light is not monochromatic, then each wavelength of light will produce its own Airy function and these Airy functions will be superimposed at the output. With non-monochromatic light, the range of wavelengths which can be handled by a Fabry-Perot interferometer without successive orders of different wavelengths overlapping (and therefore being indistinguishable) is given by the Free Spectral Range. To avoid overlapping orders, it is therefore conventional to employ a pass band filter with the interferometer having a width no greater than that of the Free Spectral Range. Different pass band filters may be successively employed if several different wavelength ranges are to be investigated.

A simple imaging Fabry-Perot interferometer comprises a Fabry-Perot etalon in front of a focusing lens. The focusing lens of such an interferometer images light emitted from a source at infinity at its focal plane. The interference pattern produced by the interferometer at this focal plane modulates this image. Consequently, a given emitting point on the source will be imaged at the focal plane and this image point will be modulated by the Airy functions from wavelengths emitted by that point.

If a point appears dark at the focal plane, this could mean either that the corresponding point on the source is dark (non-emitting) or that the corresponding point on the source, while emitting, does not emit at a wavelength which would produce an interference maximum at this particular point at the focal plane. This is an ambiguous result. Additionally, the most information which is available for any given point on the focal plane is whether the corresponding point on the source emits at one wavelength.

A known manner of resolving the foregoing ambiguity and providing information as to additional wavelengths that are emitted by a point on an extended source is to progressively change a parameter of the interferometer upon which the Airy functions depend in order to progressively shrink, or expand, the interference pattern. For example, it is known to employ a gas filled etalon and progressively change the pressure of the gas in order to progressively change the index of refraction n of the etalon. Alternatively, it is known to utilize a Fabry-Perot interferometer where the distance, d, between the two parallel working surfaces is progressively varied. Since the Airy function A varies with both n and d, either approach has the effect of progressively changing the interference pattern. If the interference pattern is progressively shrunk, interference maximums are drawn closer to the central order maximum. Consequently, these non-central order maximums will be positioned over different areas of the imaged source. Thus, if a minimum had "hidden" an emitting point on the imaged source, it will eventually be dragged off the point and replaced with a maximum so that the point is revealed as emitting light at the wavelength of the maximum now overlaying it. Consequently, all the spectral information may be extracted from the emitting point, and all other emitting points, in this fashion. Also, points that stay dark during this process are revealed as non-emitting (at least in the spectral range of interest).

A drawback with the foregoing approaches is that they require very precise manipulation of the parameter (n or d) upon which the Airy functions depend therefore resulting in an expensive interferometer. Furthermore, the time taken to progressively change parameters in the Airy functions in order to discover the full spectral signature of the source is problematic if the source spectrum is temporally varying.

Accordingly, a high resolution spectrometer capable of capturing a temporally changing spectrum and providing spectral information for different emitting areas on a source would be desirable, especially if such a spectrometer were economical.

SUMMARY OF THE INVENTION

In accordance with the invention, there is provided a Fabry-Perot spectrometer for detecting a spatially varying spectral signature of an extended source, comprising: a focusing lens for placement in a path of light from said extended source; a detector at a focal plane of said focusing lens; a Fabry-Perot etalon having two parallel working surfaces, said etalon in said light path between said focusing lens and said extended source when said focusing lens is placed in said light path; at least two cylindrical optical elements arranged for directing light from said extended source along said light path to said Fabry-Perot etalon, each of said at least two cylindrical optical elements having a vertex extending in a vertex direction which is transverse of said light path such that said at least two cylindrical optical elements are arranged for smearing said directed light in a first linear direction across said focal plane perpendicular to said vertex direction wherein an image is formed in said focal plane with spectral information in said first direction and spatial resolution of said spectral information in said vertex direction.

In accordance with another aspect of the invention, there is provided a Fabry-Perot spectrometer for detecting a spatially varying spectral signature of an extended source, comprising: cylindrical optical element means for directing light from said extended source to a Fabry-Perot etalon having two parallel working, surfaces and for smearing said directed light in a horizontal direction but not in a vertical direction; focusing means for focusing said smeared directed light which has passed through said Fabry-Perot etalon at a focal plane to provide an image in said focal plane with spectral information in said horizontal direction across said focal plane and spatial resolution of said spectral information in a vertical direction across said focal plane.

BRIEF DESCRIPTION OF THE DRAWINGS

In the drawings which illustrates example embodiments of this invention,

FIG. 2a is a perspective detail of a portion of the spectrometer of FIG. 2, FIG. 2b is a portion of a spectrometer made in accordance with another aspect of this invention.

DETAIL DESCRIPTION OF THE PREFERRED EMBODIMENTS

Figure 1:
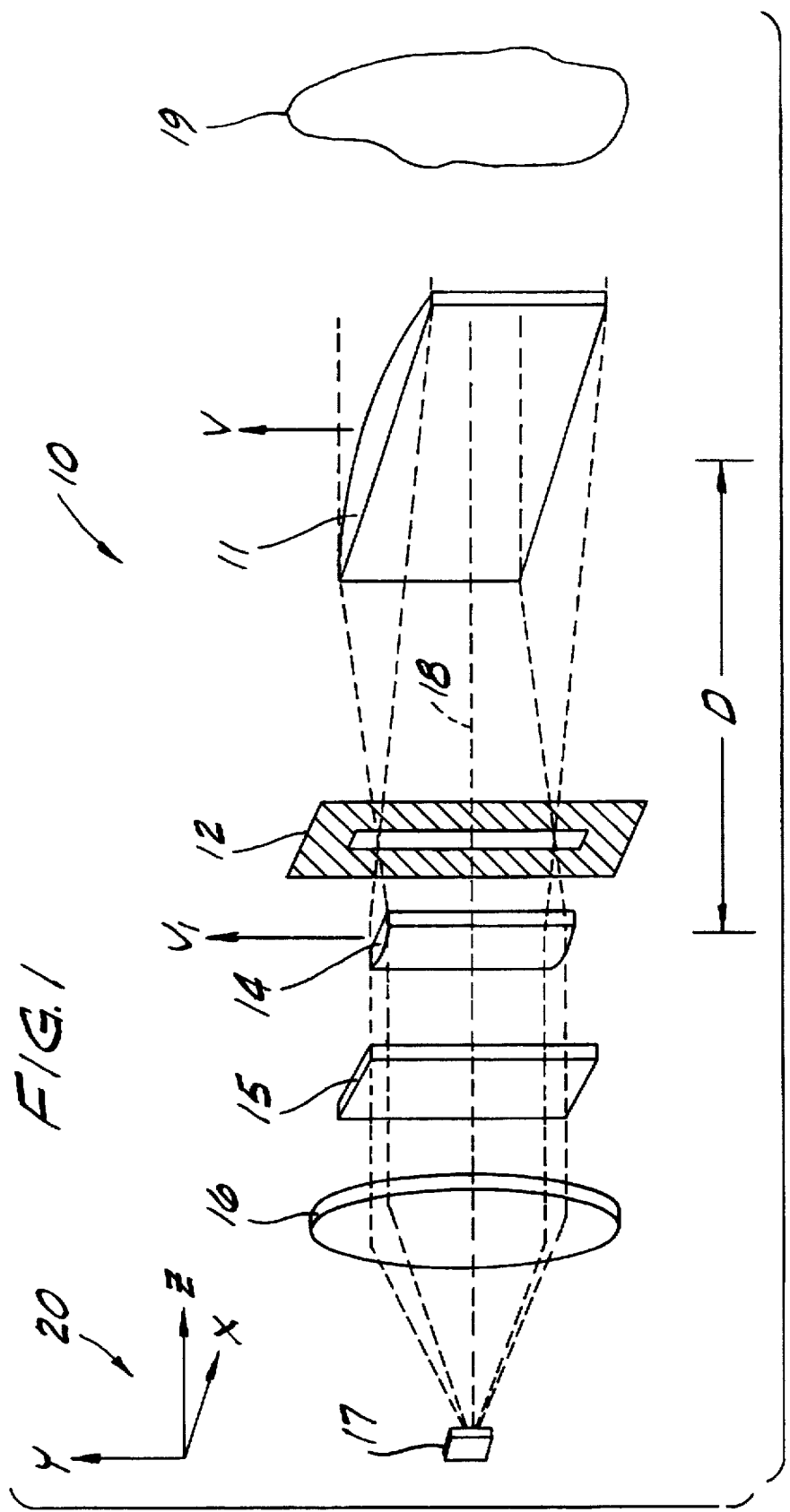
FIG. 1 is a schematic representation of a spectrometer made in accordance with this invention.

Turning to FIG. 1, a Fabry-Perot spectrometer indicated generally at 10 comprises, in downstream order, an optical element in the nature of a first cylindrical lens 11, a field stop 12, an optical element in the nature of a second cylindrical lens 14, a Fabry-Perot etalon 15, a focusing lens 16, and a detector 17.

Referring to the X-Y-Z frame of reference 20 of FIG. 1, cylindrical lenses 11 and 14 are convergent plano-convex lens with their vertices V and V', respectively, oriented in the Y-direction. Thus, these lenses focus light in the X direction illustrated in FIG. 1 but do not focus light in the Y direction. Furthermore, the distance D between lens 11 and lens 14 is chosen to be not equivalent to the sum of the focal lengths of the lenses. Thus, distance D may be either less than, or greater than, the sum of the focal distance of lens 11 and the focal distance of lens 14. Preferably, distance D is close to this sum. If distance D is less than the sum of the focal distances, then the light leaving lens 14 will be convergent. If distance D is greater than the sum of the focal distances, then light leaving lens 14 will be divergent. The cylindrical lenses 11, 14 are arranged for directing light from an extended source 19 along a light path 18 to detector 17.

The focusing lens 16 is a spherical lens. Detector 17 is a two directional focal plane array, such as a CCD camera. The field stop 12 is a narrow rectangular diaphragm oriented in the Y-direction and lying proximate the focus of lens 11. It therefore serves as a field stop in the X-direction to mask out light from other than source 19. Detector 17 may have a mask which acts as a field stop in the Y-direction.

In operation, light from extended source 19 impinges on cylindrical lens 11 and is focused in the X-direction (but not in the Y-direction) so as to be focused along a focal line. If distance D is greater than the focal length of lens 11, the light then defocuses as it moves toward lens 14. Convergent, or divergent, light leaving lens 14 undergoes multiple reflections at etalon 15 in a manner well understood by those skilled in the art so as to introduce optical path differences to light leaving the etalon. The light is then focused in both X and Y directions by spherical focusing lens 16 at detector 17.

Because light leaving lens 14 is either convergent or divergent in the X-direction, the light from the source 19 is smeared in the X-direction. This smearing is maintained by the focusing lens 16. Consequently, light at detector 17 is also smeared in the X-direction. In view of this smearing, light from source 19 is made more uniform in the X-direction than it would have been without the smearing. Thus, for any given "slice" on the source extending in the X-direction, the emitting points on the slice are smeared in the X-direction. Since each point is smeared in the X-direction, a number (or possibly all) of the interference maximums produced by a point will overlie the smeared point at the output plane and so be visible in the output plane. This means that a significant part of, or all of, the spectrum emitted by these points will appear as interference maximums at the output plane. Thus, much, or all of the spectrum emitted by each X-direction slice of the source is available at the output plane. Therefore, spectral information is available at the detector 17 for any chosen slice extending in the X-direction. Thus, spectrometer 10 provides spatial resolution in Y-direction and spectra in the X-direction. Although the spectrometer does not provide spectral information for individual points on the source, the spatial resolution it does provide is suitable for a number of applications, such as measurement of trace gases in the atmosphere.

While the lenses 11 and 14 will smear a slice on the source extending in the X-direction to make the light more uniform across the slice, any slice extending in the X-direction on the source which is entirely dark will remain dark at the output plane 20. This, of course, is not problematic because a dark slice of the source is non-emitting and, therefore, there is no spectral information to be had from such a slice.

If there are no sources of light "noise" which could enter spectrometer 10, then field stop 12 is unnecessary. If source 19 emits light at a wide range of frequencies, spectrometer 10 will require a pass band filter to limit the range of wavelengths of light to the Free Spectral Range of the etalon 15.

Because spherical focusing lens 16 has circular focusing symmetry and aberration about the Z-axis, there will be some spectral aliasing introduced by this lens. In other words, the lens may focus some spectral fringe maximums emitted by points on a given X-direction slice on a neighboring X-direction slice. This aliasing occurs toward the periphery of the output plane. How far toward the periphery depends on a number of factors. Therefore, lens 16 does limit the useful applications of spectrometer 10. Also, it may be desirable to obtain more of the spectrum from each X-direction slice of the source at the output plane. Thus, it would be preferable to have a system of optical elements which would more uniformly smear light in the X-direction than do lenses 11 and 14 of spectrometer 10, and be free of aliasing in the Y-direction.

Optionally, lens 14 may be a plano-concave lens. In such case field stop 12 is moved from its position between the lenses to a position to the outside of these lenses. The distance between such lenses should still be not equivalent to the sum of their focal lens where here, the focal length of the piano-concave lens is negative. Nevertheless, the system still has the noted drawbacks.

Figure 2:
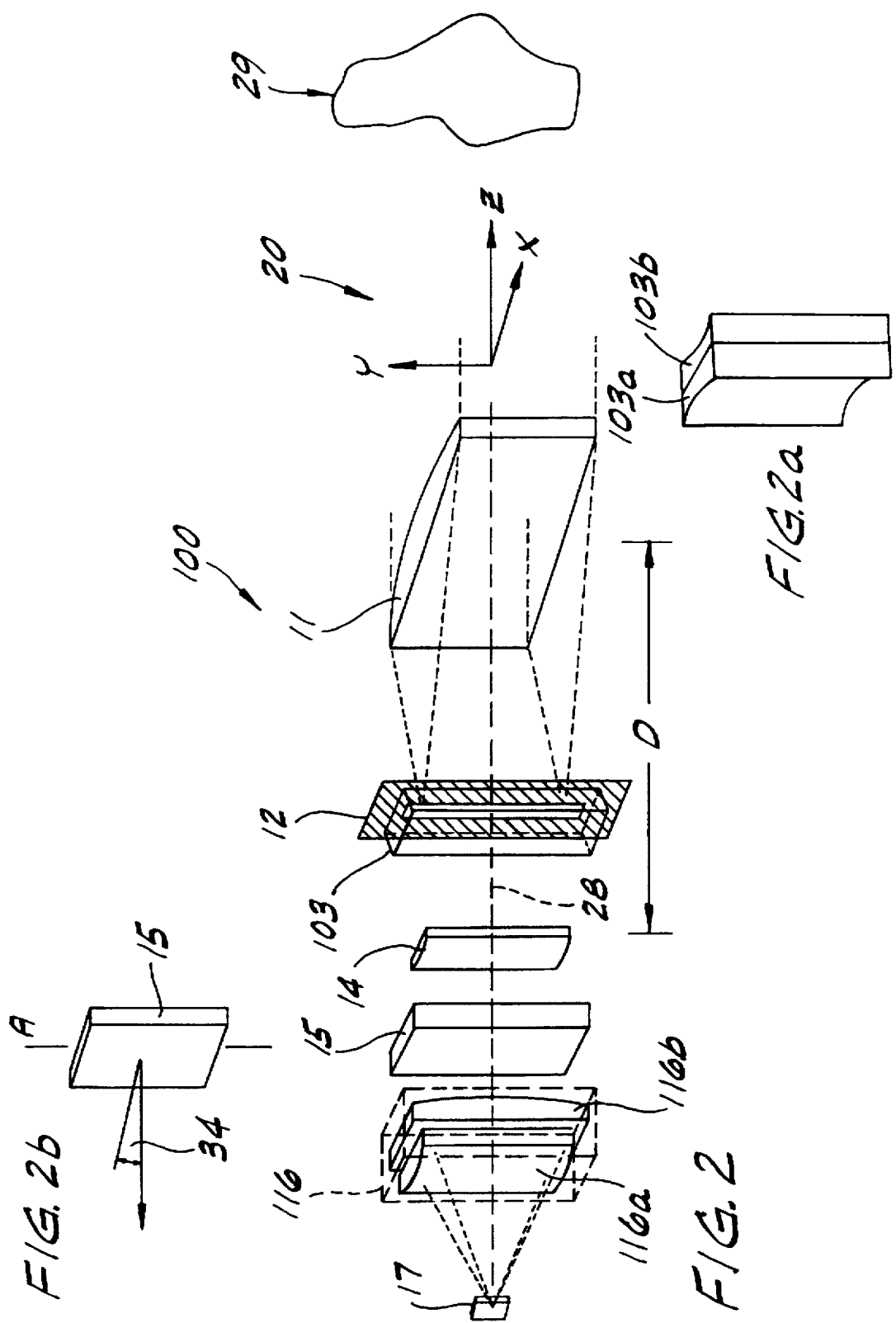
FIG. 2 is a schematic representation of a spectrometer made in accordance with a preferred embodiment of this invention.

Spectrometer 100 of FIG. 2 has been designed with a view to minimize the noted drawbacks of spectrometer 10. Turning to FIG. 2, wherein like parts to the spectrometer 10 of FIG. 1 have been given like reference numerals, a Fabry-Perot spectrometer indicated generally at 100 comprises, in downstream order, a first cylindrical lens 11, a field stop 12, a cylindrical field lens assembly 103, a second cylindrical lens 14, a fixed Fabry-Perot etalon 15, a detector lens assembly 116, and a detector 17. As illustrated in FIG. 2a, the cylindrical field lens assembly comprises two negative focal length plano-concave cylindrical lenses 103a, 103b (however one or both of this lenses could also be planoconvex). These lenses are shown as being back-to-back, but they could be spaced apart. Referring to the X-Y-Z frame of reference indicated at 20 in FIG. 2, each of the cylindrical lenses 11, 14, 103a, and 103b has their vertex oriented in the Y direction. Thus, these lenses focus light in the X direction but do not focus light in the Y direction.

The focusing lens assembly 116 comprises a first positive focal length focusing t cylindrical lens 116a having a vertex parallel to one of the X direction and Y direction and a second positive focal length focusing cylindrical lens 116b having a vertex parallel to the other of the X direction and Y direction. The vertex of lens 116a is always perpendicular to the vertex of lens 116b. These focusing lenses are plano-convex cylindrical lenses each having a focus lying at the detector 17. By employing two cylindrical lenses for focusing lens assembly 116, there is no spectral aliasing between the X and Y directions. In other words, each (arbitrarily narrow or wide) slice of light extending in the X-direction is kept separate from each adjacent slice of light extending in the X-direction at the detector 17 so that there is no mixing of spectral information from slice-to-slice. Because of this, the spectral maximums visible on any given slice extending in the X-direction will represent only the spectrum emitted by emitting points in that slice on the source. Thus, spectrometer 100 provides improved spatial resolution of spectra for slices on the source which extend in the X-direction as compared with spectrometer 10 of FIG. 1.

Neglecting detector 17, the spatial resolution of spectrometer 100 depends upon the modulation transfer ("MTF") characteristics of lens 116b. Again, neglecting detector 17, the spectral resolution depends upon the MTF characteristics of lens 116a as well as the parameters of etalon 15. Thick or compound lenses are preferred for higher spectral and spatial resolution. However, where a low f-number is required for the detector lens, the large physical size of the lens may be problematic. An alternative is to use a Fresnel-type cylindrical lens. Such a lens has straight line grooves in one direction and a relatively small thickness. Another alternative would be to use diffractive optical elements for the detector lens.

The cylindrical lenses 11, 14 are, again, spaced by distance, D. The uniformity of the smearing of light along slices parallel to the X-direction is improved by the field lens assembly 103. Thus, emitting points on a given slice are smeared substantially, or completely, across the width of the slice.

The response function of the etalon in this arrangement is believed to be described by the following function, B:

$$B = \left[ 1 + F \left( \sin \left( \frac{2\pi nd}{\lambda \sqrt{(\tan\Phi)^2 + \frac{(\tan\theta)^2}{(\cos\Phi)^2} + 1}} \right) \right)^2 \right]^{-1}$$

where $\theta$ is a projection of the incidence ray angle through the etalon in the ZOX plane, and $\Phi$ is a projection of the same ray angle in the YOZ plane. The angle $\Phi$ is a measure of the spatial angular resolution.

As with spectrometer 10 of FIG. 1, the field stop 12 may not be necessary in some applications and a band pass filter may be required in many applications.

The spectral dispersion is a function of incident ray angle through the etalon. It is symmetrical if the etalon is perpendicular to the Z-direction. This means that the zero order maximum will appear in the middle of the detector. Positioning the zero order maximum (which is large) at the centre of the detector inefficiently utilises the detector area. To avoid this difficulty, the etalon may be rotated about an axis, A, parallel to the Y-direction, as shown in FIG. 2b, so that the etalon makes a non-right angle 34 with the Z-direction. This results in a non-symmetrical output in which the zero order maximum may be positioned at the edge of the detector, or off the detector area entirely.

Figure 3:
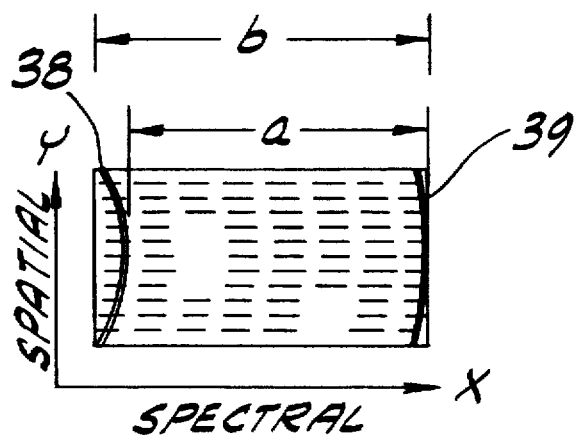
FIG. 3 is a schematic view of the output plane of the spectrometer of FIG. 2.

A schematic representation of a possible output at detector 17 of spectrometer 100 is illustrated in FIG. 3. Turning to FIG. 3, each horizontal dash represents an interference maximum for a particular wavelength emitted by one or more points on a particular slice extending in the X-direction on the source. The representative output assumes the etalon is tilted, as illustrated in FIG. 2b5, such that the central order maximum is not present. The central spectral points of two fringe orders (i.e., the central spectral points of adjacent maximums for a given wavelength) are represented by lines 38 and 39. A feature of spectrometer 100 is that the spatial distribution along the Y-direction within a limited angle of view does not contribute to spectral aliasing. Instead, as illustrated in FIG. 3, the spatial distribution gives a slight shift of the X coordinate of spectrograms for the different elevation (Y-direction) angles. To cover the same spectral range for every height, the overall spectral range is slightly increased as seen in the figure. The shift in the X position is predictable and correctable by way of data processing. FIG. 3 shows a space between adjacent X-direction slices for clarity. Actual outputs from spectrometer 100 will generally be continuous in the Y-direction and, thus, not have spaces between adjacent X-direction slices. It will also be noted from FIG. 3 that the X-direction slices toward the bottom of the detector plane lack an interference maximum present in other slices and the medial X-direction slices lack a different interference maximum present in other slices indicating that the corresponding slices on the source do not have points which emit at the wavelengths represented by the missing maximums. Thus, the output gives spectral information for X-direction slices in different spatial positions along the Y-direction.

Figure 4:
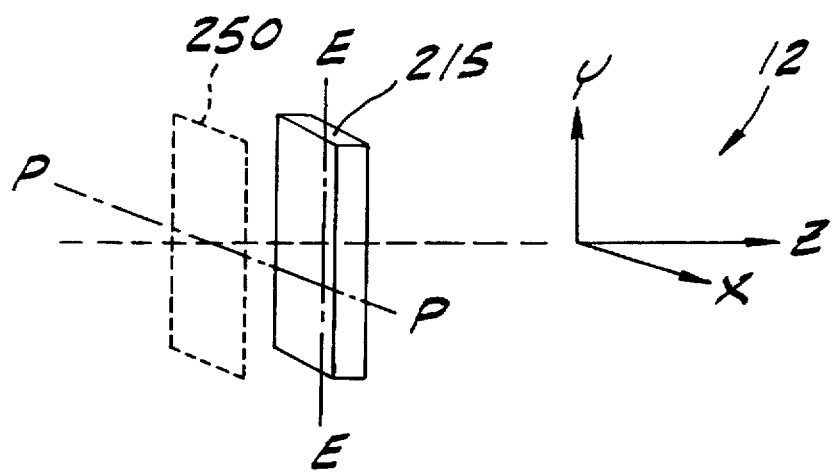
FIG. 4 is a schematic view of a portion of a spectrometer made in accordance with a further embodiment of this invention.

FIG. 4 illustrates a portion of a modified spectrometer 200 in which the etalon 15 of FIG. 2 has been replaced by etalon 215. Etalon 215 is fabricated of a uniaxial birefringent material, such as MgF$_2$. As will be understood by those skilled in the art, a birefringent material has two indices of refraction: an ordinary index of refraction and an extraordinary index of refraction. In etalon 215, the optical birefringence axis E—E is parallel to the working planes of the etalon and parallel to the Y-direction. With this arrangement, for all incoming rays which are at any incident angle to the etalon and parallel to the XOZ plane, no extraordinary rays leave etalon 215. Further, for incident rays parallel to the YOZ plane which make a small incident angle with the etalon, the extraordinary rays leaving the etalon are indistinguishable from the ordinary rays. Further, for larger incidence angles in the YOZ plane, the extraordinary rays leaving the etalon may be rejected by the addition of a linear polarizer 250 downstream of the etalon which has a polarization axis P—P parallel to the X-direction. (Other rays can be decomposed into components parallel to the XOZ plane and components parallel to the YOZ plane and, therefore, dealt with as above.)

As will be appreciated by those skilled in the art, the advantage of being able to use an etalon fabricated of birefringent material is that some birefringent materials have very good transmission characteristics in a particular spectral region. For example, MF$_2$ is a uniaxial birefringent material having very good transmission in the vacuum ultraviolet region.

It will be appreciated from the foregoing that the spectrometers of this invention provide spatially dependent spectral information in one direction (the X- direction), with the spatial resolution of the spectral information being in a perpendicular direction (the Y direction). In applications such as the measurement of trace gases in the atmosphere, this degree of spatial resolution is all that is required. It will also be noted that the spectral and the spatial information is collected simultaneously so that temporally varying sources may be measured.

If a spectrometer made in accordance with this invention is used as a limb imager of the earth's atmosphere with vertical resolution, it will be appreciated that X-direction would be tangential to the horizon.

While lens 11, 14, 103a, 103b have been described as simple plano-convex or plano-concave lenses, it will be appreciated that any of these lenses may be replaced by a suitable compound lens, diffractive lens, or Fresnel lens.

While the example spectrometers of this invention have been implemented with refractive optics, it will be appreciated by those skilled in the art that a combination of refractive and reflective optics could also be employed. This gives the potential for applications requiring a large spectral range. For any of the example spectrometers of this invention, the angle of view in the Y-direction could be increased by using a conventional telescope of suitable magnification upstream of the spectrometer. Other modifications will be apparent to those skilled in the art and, therefore, the invention is defined in the claims.

What is claimed is:

1. A Fabry-Perot spectrometer for detecting a spatially varying spectral signature of an extended source, comprising:

a focusing lens for placement in a path of light from said extended source;

a detector at a focal plane of said focusing lens;

a Fabry-Perot etalon having two parallel working surfaces, said etalon in said light path between said focusing lens and said extended source when said focusing lens is placed in said light path;

at least two cylindrical optical elements arranged for directing light from said extended source along said light path to said Fabry-Perot etalon, each of said at least two cylindrical optical elements having a vertex extending in a vertex direction which is transverse of said light path such that said at least two cylindrical optical elements are arranged for smearing said directed light in a first linear direction across said focal plane perpendicular to said vertex direction wherein an image is formed in said focal plane with spectral information in said first direction and spatial resolution of said spectral information in said vertex direction.

2. The spectrometer of claim 1 wherein said at least two cylindrical optical elements include a first cylindrical lens having a first focal length and a second cylindrical lens having a second focal length, said first and second cylindrical lenses spaced a distance apart which is not equivalent to the sum of said first focal length and said second focal length.

3. The spectrometer of claim 2 wherein said at least two cylindrical optical elements further include a cylindrical field lens positioned between said first and second cylindrical lenses, said cylindrical field lens having a negative focal length.

4. The spectrometer of claim 3 wherein said cylindrical field lens is a first cylindrical field lens and wherein said at least two cylindrical optical elements include a second cylindrical field lens having a second negative focal length, said second cylindrical field lens positioned between said first and second cylindrical lenses.

5. The spectrometer of claim 3 wherein said first cylindrical field lens and said second cylindrical field lens comprise a pair of plano-concave lenses.

6. The spectrometer of claim 5 including an elongated field stop in said light path parallel to said first cylindrical lens vertex and lying proximate a focal plane of said first cylindrical lens.

7. The spectrometer of claim 6 wherein said Fabry-Perot etalon is a fixed etalon fabricated of a uniaxial birefringent material such that the optical birefringence axis of said birefringent material is parallel to said two working surfaces of said etalon and wherein said etalon is oriented such that said optical birefringence axis is parallel to said vertex direction.

8. The spectrometer of claim 7 including a linear polarizer having a polarization axis perpendicular to said vertex direction and positioned for polarizing light exiting said etalon.

9. The spectrometer of claim 8 wherein said birefringent material is MgF$_2$.

10. The spectrometer of claim 6 wherein said first cylindrical lens is a plano-convex lens and said second cylindrical lens is a plano-convex lens.

11. The spectrometer of claim 6 wherein said etalon is rotated about an axis parallel with said vertex direction to a position such that a central order interference fringe resulting from light passing along said light path is displaced from a centre of said detector.

12. The spectrometer of claim 2 wherein said focusing lens comprises a first cylindrical focusing lens having a vertex parallel to said vertex direction and wherein said spectrometer comprises a second cylindrical focusing lens having a vertex transverse to said light path and perpendicular to said vertex direction, said detector also being in a focal plane of said second cylindrical focusing lens.

13. A Fabry-Perot spectrometer for detecting a spatially varying spectral signature of an extended source, comprising:

a focusing lens for placement in a path of light from said extended source;

a detector at a focal plane of said focusing lens;

a Fabry-Perot etalon having two parallel working surfaces, said etalon in said light path between said focusing lens and said extended source when said focusing lens is placed in said light path;

at least two cylindrical lenses arranged for directing light from said extended source along said light path to said Fabry-Perot etalon, each of said at least two cylindrical lenses having a vertically oriented vertex such that said cylindrical lenses are arranged for smearing said directed light in a horizontal direction across said focal plane but not in a vertical direction, wherein an image is formed in said focal plane with spectral information in said horizontal direction across said focal plane and spatial resolution of said spectral information in a vertical direction across said focal plane.

14. The spectrometer of claim 13 wherein said at least two cylindrical lenses include a first cylindrical lens having a first focal length and a second cylindrical lens having a second focal length, said first and second cylindrical lenses spaced a distance apart which is not equivalent to the sum of said first focal length and said second focal length.

15. The spectrometer of claim 14 wherein said focusing lens comprises a first cylindrical focusing lens having a vertex parallel to said vertex direction and wherein said spectrometer comprises a second cylindrical focusing lens having a vertex transverse to said light path and perpendicular to said vertex direction, said detector also being in a focal plane of said second cylindrical focusing lens.

16. The spectrometer of claim 15 wherein said etalon is rotated about an axis parallel with said vertex direction to a position such that a central order interference fringe resulting from light passing along said light path is displaced from a centre of said detector.

17. A Fabry-Perot spectrometer for detecting a spatially varying spectral signature of an extended source, comprising:

cylindrical optical element means for directing light from said extended source to a Fabry-Perot etalon having two parallel working surfaces and for smearing said directed light in a horizontal direction but not in a vertical direction;

focusing means for focusing said smeared directed light which has passed through said Fabry-Perot etalon at a focal plane to provide an image in said focal plane with spectral information in said horizontal direction across said focal plane and spatial resolution of said spectral information in a vertical direction across said focal plane.

18. The spectrometer of claim 17 wherein said cylindrical optical element means include a first cylindrical lens having a first focal length and a second cylindrical lens having a second focal length, said first and second cylindrical lenses spaced a distance apart which is not equivalent to the sum of said first focal length and said second focal length, said first cylindrical lens having a vertex which is parallel to said focal plane and second cylindrical lens having a vertex parallel to said first cylindrical lens vertex.

19. The spectrometer of claim 18 wherein said focusing means comprises a first cylindrical focusing lens having a vertex parallel to said first cylindrical lens vertex and wherein said spectrometer comprises a second cylindrical focusing lens having a vertex perpendicular to said first cylindrical lens vertex and parallel to said focal plane.

20. The spectrometer of claim 19 wherein said etalon is rotated about an axis parallel with said first cylindrical lens vertex to a position such that a central order interference fringe is displaced from a centre of said focal plane.

* * * * *